Patented Mar. 18, 1924.

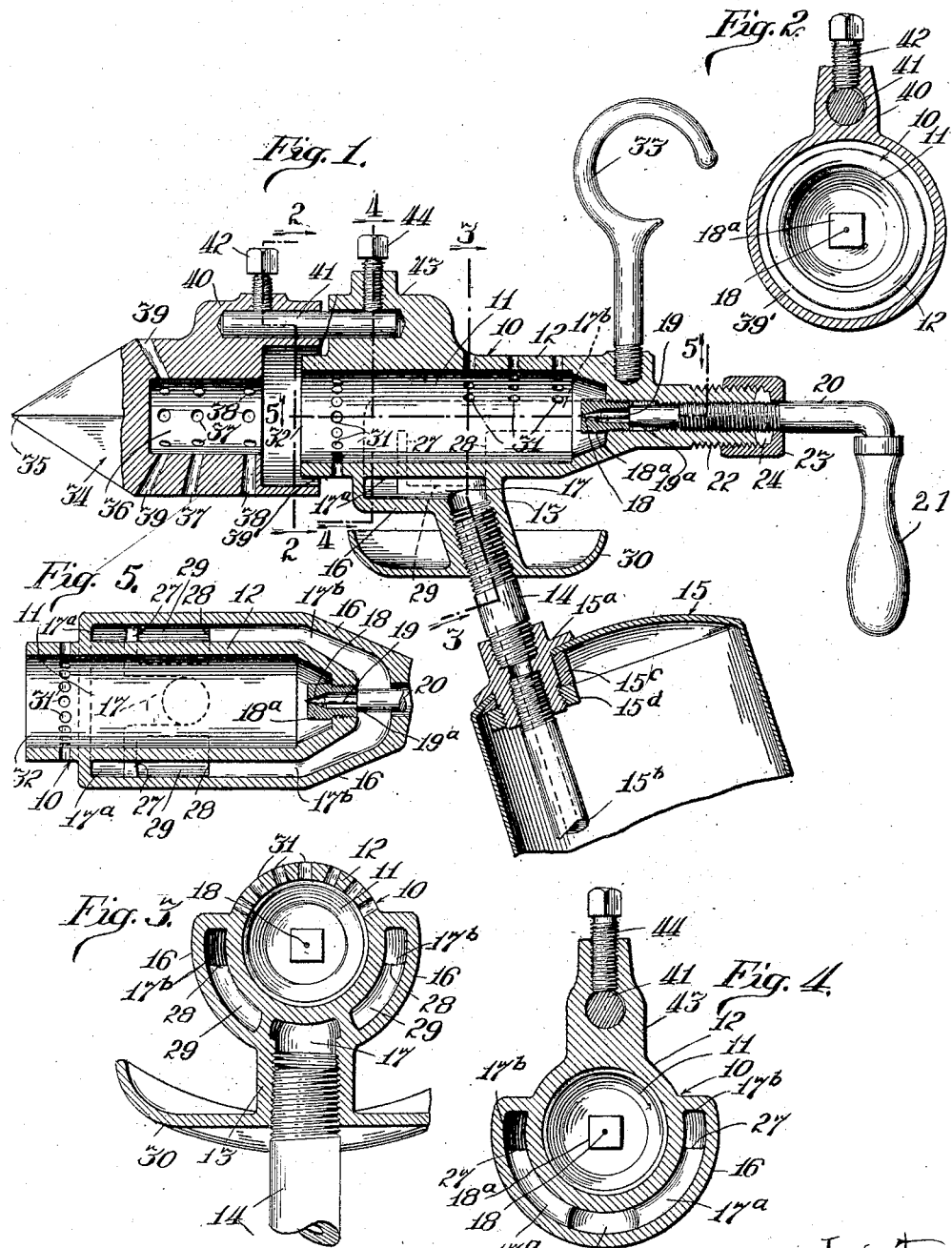

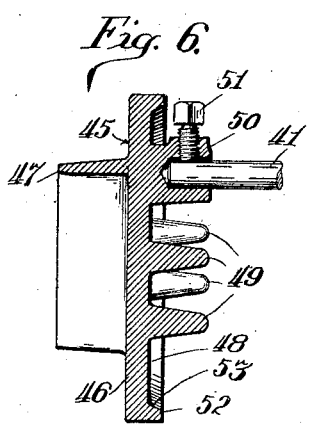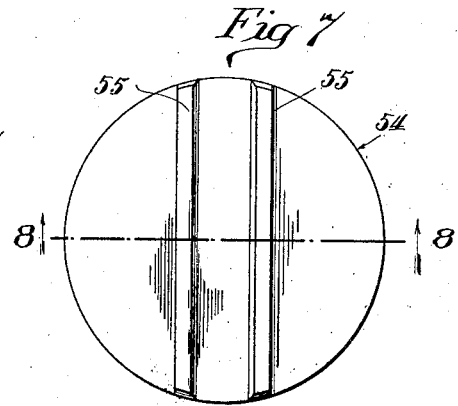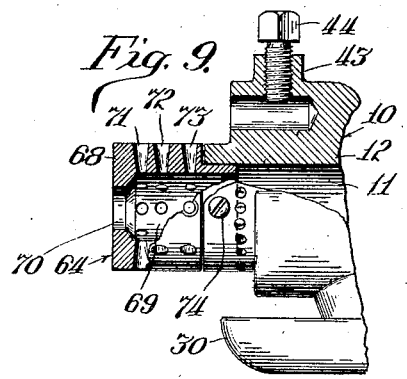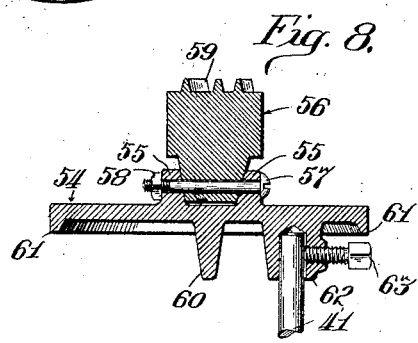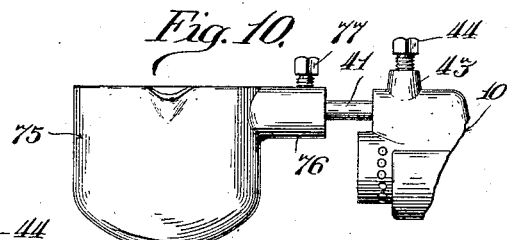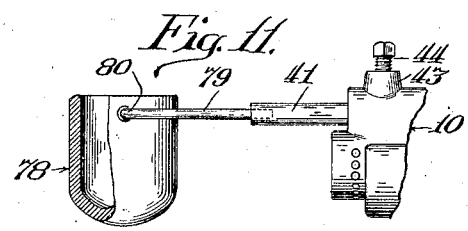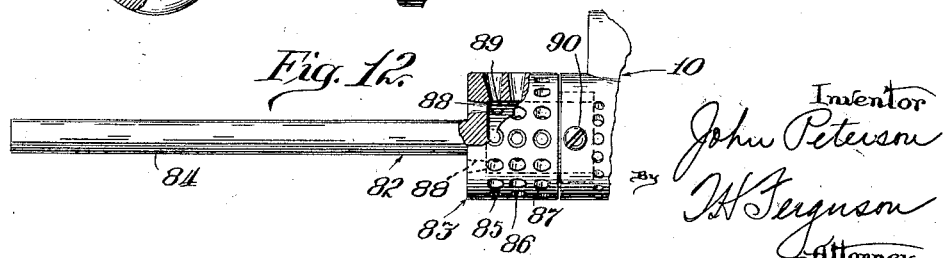

1,487,359

UNITED STATES PATENT OFFICE.

JOHN PETERSON, OF MAYWOOD, ILLINOIS.

TORCH.

Application filed June 24, 1921. Serial No. 480,017.

*To all whom it may concern:*

Be it known that I, JOHN PETERSON, a citizen of the United States, residing at Maywood, in the county of Cook, State of Illinois, have invented certain new and useful Improvements in Torches, of which the following is a specification.

The present invention relates to torches of the class which burn a mixture of air and fluid fuel to heat various devices.

One object of the invention is to produce a novel arrangement of parts for heating the fuel on its way to the combustion chamber. Another object is to produce an improved device for controlling the torch flame. The various features and advantages of the invention will be more fully understood upon reference to the following detailed description taken in connection with the accompanying drawings and the scope of the invention will be particularly pointed out in the appended claims.

Although I have disclosed herein several devices for attachment to the torch, yet I have presented the branding iron of Figs. 6, 7 and 8 in a continuing application, Serial No. 691,371, filed February 8, 1924 and the ladles of Figs. 10 and 11 in a divisional application, Serial No. 691,372, filed February 8, 1924. The torch and the reducer are particularly claimed in this application.

In said drawing, Fig. 1 is a vertical section of a torch and soldering point constructed in accordance with the present invention; Fig. 2 is a transverse section through the tip just forward of the torch, taken on a plane indicated by the line 2—2 of Fig. 1; Fig. 3 is a transverse section through the body of the torch, taken on a plane indicated by the line 3—3 of Fig. 1; Fig. 4 is a similar section taken on a plane indicated by the line 4—4 of Fig. 1; Fig. 5 is a horizontal section taken on a plane indicated by the line 5—5 of Fig. 1; Fig. 6 is a vertical section of a branding iron arranged for attachment to the discharge end of the body of the torch; Fig. 7 is a face view of a modified branding iron arranged for the attachment of removable branding elements; Fig. 8 is a transverse section of the same with one of these elements in position, the section being taken on a plane indicated by the line 8—8 of Fig. 7; Fig. 9 is a view showing a reducer connected at the discharge end of the combustion chamber of the torch, parts being shown in central vertical section; Fig. 10 is an elevation of a portion of the body of the torch and a ladle positioned in the path of the torch flame; Fig. 11 is a similar view of a modified ladle structure; and Fig. 12 is a similar view illustrating a special form of soldering tip, a portion of the latter being shown in vertical section. Throughout these views like characters refer to like parts.

Referring to the drawing in detail, 10 designates the body of the torch which is bored out so as to provide a mixing and combustion chamber 11 enclosed by a peripheral wall 12. Obviously the shape of this chamber 11 might be varied with a corresponding variation in the shape of the wall 12. The body of the torch is provided with a downwardly extending tubular shank 13 which is interiorly threaded for the reception of a connecting tube 14 through which fuel under pressure is supplied from the fuel chamber 15. The latter may be any desired form and the tube may be variously shaped so as to change the position of the chamber 15 with reference to the body 10 of the torch. The tube 14 is connected to the tank 15 by being threaded into a nipple $15^a$. A communicating tube $15^b$ is similarly connected to the nipple on the inside of the tank 15. The nipple is flanged and fitted to the tank end and a washer $15^c$ and nut $15^d$ hold the nipple securely in place. Preferably the tube $15^b$ terminates near the bottom of the fuel chamber 15 and a pump is employed to pump air into the chamber and thereby place the fuel under pressure. Ordinarily the fuel employed is gasolene. The arrangement of the fuel supply tank and connecting tubes in this way is old and in itself forms no part of my invention.

In addition to the wall 12 of the body 10 I provide a wall 16 located outwardly of the wall 12 and spaced from it so as to provide central and lateral fuel passages 17, $17^a$ and $17^b$. Passage 17 is located centrally upon the underside of the torch and communicates at its rear end with tube 14 and at its forward end with the upward and outward extending lateral passages $17^a$. The latter communicate with the forward ends of the rearward extending passages $17^b$ which extend along the sides of the torch and come together at the rear of the chamber 11. The passages $17^b$ communicate with the chamber 11 through a valve controlled opening 18 in a nipple $18^a$ threaded into a threaded opening in the rear wall of chamber 11. The opening 18 is controlled by a needle valve 19. The latter is located at the end of a threaded rod 20 which is provided with an angularly disposed handle 21. The threads upon the rod 20 co-operate with the threads on the interior of a shank 22 which extends rearward from the body 10. A gland 23 and packing 24 maintain a tight connection around the rod 20. Because of the threads upon the interior of the shank 22 and the exterior of the rod 20 a movement of the handle 21 about the axis of the rod will cause a slight opening or closing movement of the needle valve 19. By this construction an accurate and minute adjustment of the discharge opening may be obtained. The liquid fuel passes from the tube 14 through passages 17 and 17$^a$ to the passages 17$^b$ and thence into the chamber 11 through the valve controlled opening 18.

It should be noted that the needle valve 19 is set in an opening formed in the flat end or shoulder 19$^a$ of the rod 20. The shoulder 19$^a$ abuts against the rear end of the nipple 18$^a$ as a valve upon its seat and forms a primary closing point for the valve structure. The needle 19 is so set that it will just close the opening 18 at the time the shoulder 19$^a$ seats itself, provided the torch is cool. If the latter is in use and hot, the expanded metal of the nipple will leave the opening 18 slightly open around the needle 19 at the time the shoulder 19$^a$ seats itself; but as the torch cools the metal of the nipple will contract to make a tight closure at the needle point. This valve structure in itself forms the subject of another patent and in so far as it alone is concerned forms no part of the invention sought to be covered herein.

In connection with each of the fuel passages 17$^b$ I provide a fuel pocket or compartment 29 which is adapted to receive fuel in liquid form. These pockets are formed by walls 27 and 28 which join walls 12 and 16 and extend transversely up to the bottom of the passages 17$^b$. The employment of these pockets allows a considerable quantity of liquid fuel to be brought into close proximity to the heating chamber 11 whenever the fuel passing into the torch is not immediately vaporized. By bringing the fuel into such close proximity to the chamber 11 it will be heated and readily vaporized. These pockets serve as reservoirs for the liquid fuel and thus insure an ample supply of vaporized fuel to the chamber 11.

In order to heat the torch at the beginning of operations, I provide a fuel pan 30 which is either integral with the extension 13 or suitably attached to it. By placing gasolene in this pan and lighting it, the body 10 of the torch will be heated up and fuel admitted from the tank 15 will be vaporized and as it passes through chamber 11 will mix with air admitted through variously disposed holes 31 and when so mixed combustion will take place and a flame will issue from the discharge end 32 of the chamber 11. For convenience in handling the torch a hook-shaped finger piece 33 is provided near its rear end. Other arrangements for mounting and handling the torch may be readily made and will suggest themselves to workers in this art.

In Fig. 1 I have illustrated a soldering tip 34 against which the flame emitted from the opening 32 impinges. The forward end of the tip 34 is provided with a soldering point 35 and the rear end of the same is provided with a chamber 36 into which the flame passes. From the latter the flame passes to atmosphere through a number of openings 37, 38 and 39. These openings extend outward from the axis of the chamber and the openings 38 extend practically radially while the openings 37 and 39 are inclined forward as they pass toward the outside of the tip. By the arrangement of the openings 37 and 39 in this way I am enabled to get a better heating of the point 35 than with the openings merely radial. This is an important feature in connection with the construction of this tip. This advantage in heating is the result of cleansing the chamber 36 of impurities and objectionable products of combustion. This cleansing results particularly from giving the forward holes the forward and outward inclination.

The rear end of the tip is made of sufficient size to fit over the wall 12 at the outlet 32 and leave a peripheral air inlet 39′ through which air is drawn into the chamber 36 and combustion within the soldering tip improved with the result of more efficient heating of the same for service. In order to make the tip removable, I provide upon it a boss 40 which is bored out for the reception of a coupling pin 41. A set screw 42 threaded through the outer wall of the boss serves to hold the tip 34 and the pin 41 together. The pin 41 extends at its rear end into a similar opening in a boss 43 formed upon the body 10 of the torch, and a similar set screw 44 serves to hold the pin 41 in place. By the use of these parts the tip 34 is firmly secured in place upon the outer end of the body of the torch and at the same time it may be removed for the replacement of other attachments when desired.

Among these other attachments, I may employ a branding iron 45, shown more particularly in Fig. 6. This branding iron comprises a relatively flat body 46 having a branding element 47 on the one side and a flame impinging surface on the other. The latter surface has its superficial area increased by reason of the points 49 which extend outward from the body 46 and are integral with it. Since all are of metal, the flame which impinges against these points has its heat more readily conducted to the branding element 47. The latter may be of any preferred shape. In some instances it will consist of a letter, in others a mark or some distinguishing character and in still others perhaps a word. The body 46 is provided upon its rear face with a boss 50 which is drilled out for the purpose of receiving the forward end of the pin 41 associated with the discharge end of the torch. A set screw 51 firmly secures the branding iron to the pin. It will be seen that when the pin is in position upon the torch, the branding iron will lie directly in front of the discharge opening 32 of the chamber 11. Consequently the flame coming from that chamber will impinge upon the surface 48 and the associated projections 49 upon the branding iron. In order to prevent the flame from flaring in such a way as to burn or otherwise disfigure the object being branded, whether animate or inanimate, I provide means for deflecting the flame backward away from the plane of the body 46 and consequently away from the object. In the present instance I employ a peripheral flange 52 which extends rearward from the body 46 and by reason of its inclined wall 53 reverts the flame. Obviously other arrangements might be employed of bringing about this same advantage. It is also apparent that the flange 52 need not have the inclined wall 53 such as I have illustrated.

Instead of having the branding element fixed to and forming part of the branding iron, I may employ a branding iron of the form shown in Figs. 7 and 8 wherein the body 54 is similar to the body 46 but has on its front face merely two ribs 55, between which a removable branding element 56 may be secured by means of one or more bolts 57 and nuts 58. The forward end of the iron 56 contains the marking elements 59 as will be apparent. In this instance the inner faces of the ribs 55 will diverge outward and the portion of the branding element 56 which engages them will be wedge-shaped so as to closely fit against these fastenings. With this construction a space at the rear end of the branding element would still allow for a wedging fit between the faces of the element and the engaged faces of the ribs. In this instance the body 54 is provided with a projection 60 like the projections 49 and a flange 61 like the flange 52. A similar boss 62 and set screw 63 co-operate with the pin 41 to hold the iron in position upon the end of the torch.

Instead of employing the soldering tip of Fig. 1 or the branding iron of Figs. 6, 7 and 8, I may in some instances desire to reduce the size of the flame emitted from the chamber 11 and to apply the flame directly to the work upon which the torch is being used. In such instances I may employ a reducer 64 of the character illustrated in Fig. 9. This attachment comprises a body 68 which has an interior chamber 69 and an outlet 70, the latter being of considerably less cross sectional area than the discharge outlet 32 of the torch. In this reducer I also employ a number of radial openings 72 and 73. When in use the flame passes from the chamber 11 into the chamber 69 and thence out through the axial opening 70 and the radial openings 71, 72 and 73. The portion of the flame passing through the axial opening is the one used upon the work. Since the opening 70 is much larger than any one of the openings 71, 72 and 73 the flame emitted from it will be larger and may be used directly upon the work. In the case of the reducer the rear end of the body 68 is cut away so as to snugly fit within the end of the chamber 11 as clearly shown in Fig. 9. It is held in position by one or more set screws 74 which pass through the wall 12 of the torch into engagement with the enclosed wall of the reducer.

In some instances, as illustrated in Fig. 10, it may be desirable to have the torch flame impinge directly upon a ladle containing solder. In such event a ladle 75 may be mounted upon the outer end of the pin 41 and the body of the ladle may lie in position to be engaged by the flame emitted from the end of the torch. In the case illustrated, the ladle has a projection 76 which is bored out for the reception of the pin 41 and a set screw 77 passing through a threaded opening in the projection 76 engages the pin 41 to hold it in place. In this instance the ladle will be held from rotation and the torch and ladle may be handled as a unit. This arrangement is advantageous where the torch is provided with a light fuel tank 15 and where the tank, torch and all are handled by the operator as a single tool. In such case the solder when heated in the ladle 75 may be readily poured out by the user merely picking up the whole device and handling it as a single instrument.

In other cases, notably in electric wiring, it may be desirable to employ a ladle which will allow of a certain movement of the torch without changing the position of the solder in the ladle. In such instances a ladle of the type illustrated in Fig. 11 may be employed. In this instance the ladle, designated 78, is pivotally mounted between the ends of a bifurcated arm 79 which extends outward as a permanent extension of the pin 41. With this construction the ladle 78 is pivotally mounted so as to freely rotate about an axis passing through the pivotal points 80. So long as the torch is moved about this axis the ladle 78 will remain upright and its contents will not be spilled. With this construction it is possible for any electric wireman to get into corners and other out-of-the-way places in order to dip the twisted ends of a wire joint into the solder contained in the ladle or pot 78 and thus make a soldered joint. Indeed, the arrangement may be used in any place where the pot 78 can be brought underneath the wires to be soldered. Other uses will suggest themselves to persons working with solder.

In still other instances the torch may be used with a special tip 82 which is designed for soldering radiators of the honey-comb type. Such a tip is illustrated in Fig. 12. In this instance there is a body 83 which is similar to the reducer 64, and a rod 84. The body is provided with a number of radial openings 85, 86 and 87 and with a series of longitudinal openings 88. These openings connect the interior chamber 89 with atmosphere and the flame coming from the combustion chamber passes through the chamber 89 and out through these openings. The principal openings which are relied upon to do the work of heating are the openings 88. These are positioned in a circle around the rod 82 and in each instance extend axially so as to cause the flames which are emitted from them to pass along the sides of and strike against the rod 84 and thoroughly heat it. By this construction I am enabled to heat the outer end of the rod 84 to a proper working temperature. In this way I have a tip by which heat may be applied to solder in honey-comb radiators and in other places difficult of access. In the instance the rear end of the body 83 fits into the end of the chamber 11 just as it does in the case of the reducer of Fig. 9 and the parts are held together by a set screw 90 which is similar in construction and function to the set crews 74 employed upon the reducer.

In carrying out my invention it will be seen that many alterations may be made in the embodiments illustrated without departing from the spirit and scope of the invention. I therefore aim to cover by the terms of the appended claims all such alterations and changes as rightly come within the scope of my invention.

What I claim as new and desire to secure by Letters Patent of the United States, is:

1. A device of the class described, comprising a combustion chamber, a fuel chamber adapted to contain fuel under pressure, a passage between said chambers, a needle valve for controlling said passage at its outlet into said combustion chamber, and a pocket formed in the bed of said passage positioned adjacent to said combustion chamber so as to be heated therefrom, and adapted to collect liquid fuel in a pool beneath the stream of vaporized fuel flowing through said passage.

2. In a device of the class described, a combustion chamber having a metal wall, a passage for supplying fuel under pressure to said chamber, said passage extending along the exterior of said wall, and a compartment formed on the exterior of said wall and communicating with the under side of said passage so as to form a basin for the collection of liquid fuel in a pool beneath the stream of vaporized fuel flowing through said passage.

3. In a device of the class described, a combustion chamber having a metal wall, a passage for supplying fuel under pressure to said chamber, said passage extending along the exterior of said wall, a compartment formed on the exterior of said wall and communicating with the under side of said passage so as to form a basin for the collection of liquid fuel in a pool beneath the stream of vaporized fuel flowing through said passage, and a heating pan directly beneath said compartment.

4. In a device of the class described, a combustion chamber having an open discharge end, means for supplying fuel under pressure to said chamber, and a detachable reducer fitted to the discharge end of said chamber and comprising a central chamber, several flame emitting radial openings and a single flame emitting axial opening of less cross sectional area than the discharge end of said chamber, and of greater cross-sectional area than each of said radial openings.

5. In a device of the class described, a combustion chamber having a metal wall, a passage for supplying fuel under pressure to said chamber, said passage extending forward along the under side of said wall, then dividing into two branches extending laterally and upward along said wall, then rearward in two branches along said wall to a junction point and then forward to said chamber, and two pockets formed in the beds of said rearward extending branches forming receptacles for pools of liquid fuel directly beneath the rearward traveling streams of vaporized fuel.

6. In a device of the class described, a combustion chamber having a metal wall, a passage for supplying fuel under pressure to said chamber, said passage extending forward along the under side of said wall, then dividing into two branches extending laterally and upward along said wall, then rearward in two branches along said wall to a junction point and then forward to said chamber, two pockets formed in the beds of said rearward extending branches forming receptacles for pools of liquid fuel directly beneath the rearward traveling streams of vaporized fuel, and a centrally disposed needle valve for controlling the discharge of vaporized fuel from said passage into said chamber, said valve extending through said passage at said junction point.

7. In a device of the class described, a combustion chamber having an open discharge end and several radial openings near said end, means for supplying fuel under pressure to said chamber, and a detachable reducer fitted to the discharge end of said chamber outward of its said radial openings so as to leave the latter clear, said reducer also having a plurality of rows of radial openings and a single central opening in its outer wall, said opening being in cross-sectional area intermediate of the main discharge opening of said chamber and its said radial openings.

8. In a device of the class described, a cylindrical combustion chamber, valve controlled means for admitting fuel under pressure at one end of said chamber, the opposite end of the chamber having an open discharge outlet, a detachable reducer fitted into the discharge outlet of said chamber and having a central chamber forming a substantial continuation of said combustion chamber, the lateral wall or walls of said reducer being pierced by several flame emitting radial openings and the forward end of said central chamber terminating in a flame emitting discharge outlet of cross-sectional area intermediate of the cross-sectional areas of the discharge end of said combustion chamber and of said individual radial openings.

In testimony whereof, I hereunto subscribe my name this 23rd day of June, A. D. 1921.

JOHN PETERSON.